(No Model.)
C. A. DANALS.
AUTOMATIC POLE CHANGER.
No. 411,238. Patented Sept. 17, 1889.
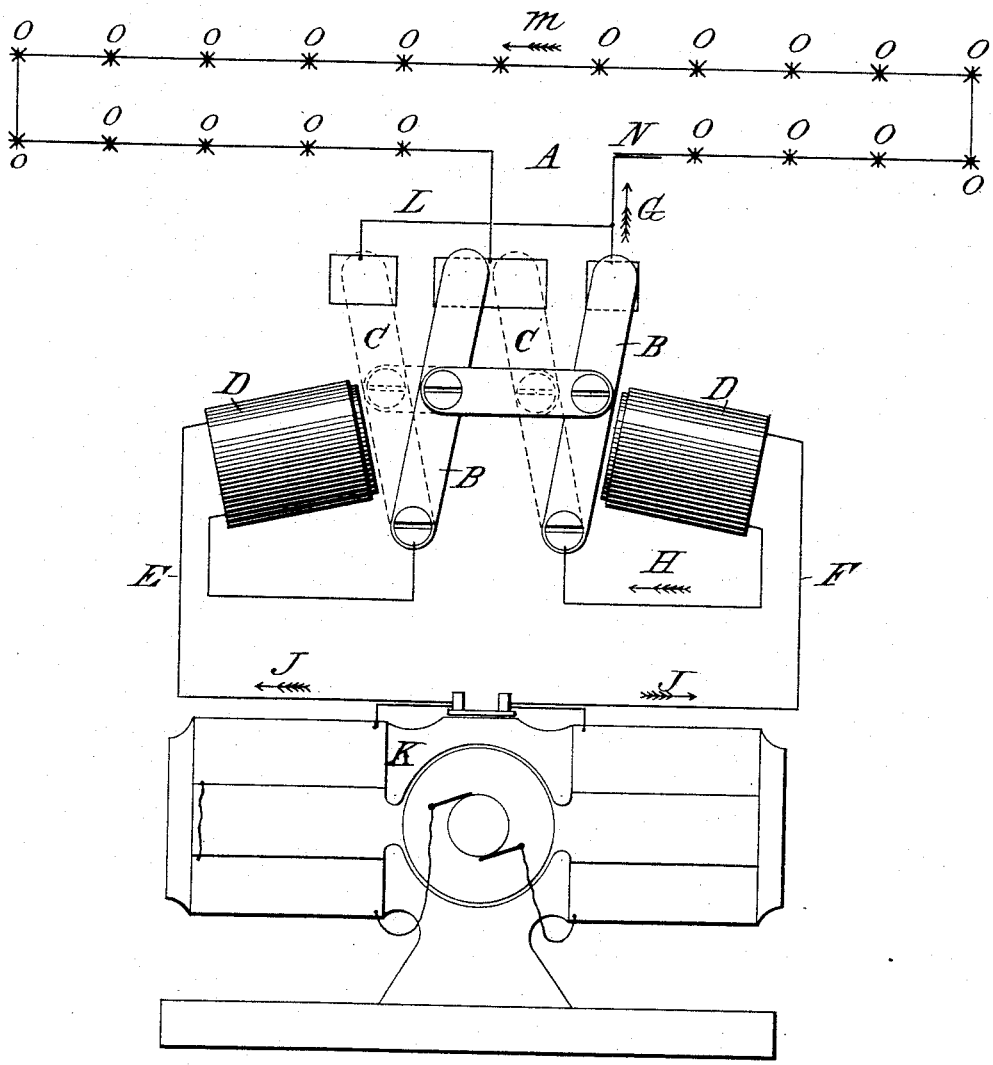
Witnesses:
Albert L. Fickel
S. M. Winn
Inventor:
Cyrus A. Danals.

UNITED STATES PATENT OFFICE.

CYRUS A. DANALS, OF ZANESVILLE, OHIO.

AUTOMATIC POLE-CHANGER.

SPECIFICATION forming part of Letters Patent No. 411,238, dated September 17, 1889.

Application filed May 29, 1889. Serial No. 312,672. (No model.)

*To all whom it may concern:*

Be it known that I, CYRUS A. DANALS, of Zanesville, Ohio, have invented a new and useful Improvement in Controlling Electric Currents, of which the following is a full, clear, concise, and exact description, reference being had to the accompanying drawing, forming a part of this specification.

My invention relates to electric currents; and its object is to provide means for automatically controlling the course of electric currents over electric circuits and through electric lamps, electric motors, or other electric appliances which are designed to have their currents pass through them in one and the same direction at all times.

As all electric currents have a positive and negative pole, it is very important in many electrical devices — such as electric-arc lamps — that the current pass through them in one and the same direction at all times; and as lightning very often changes the polarity of a dynamo-electric machine it also often happens that men in arranging circuits on a switch-board at a central station will connect them reversely and thereby send the current over the circuit in the wrong direction, causing damage to any electrical device in the circuit designed to have the current pass through it in a given direction. I have invented this automatic electric-current pole-changer for the purpose of sending the current over a circuit in one and the same direction at all times regardless of the polarity of a dynamo-electric machine or electric batteries or any mistakes that may be made in the polarity of the current in the connecting of their circuits.

My invention is illustrated in the accompanying drawing, in which—

A is a diagram showing an arc-light circuit.

B B are armatures forming a part of an automatic switch.

Dotted lines C C represent a reverse position of armatures B B.

D D are polarized magnets, which control armatures B B.

E and F are wires leading from polarized magnets D D to dynamo-electric machine K.

Now if machine K is put in operation the current will pass over wire F in the direction indicated by arrows J and H, through polarized magnet D, over armature B, wire N, and through lamps O O of circuit A in the direction indicated by the arrows G and M, over armature B, through polarized magnet D, over wire E to K. Now should the polarity of K be changed through any cause whatsoever the current will pass from K over wire E, through polarized magnet D to armature B, and thereby cause polarized magnet D to attract armature B and move armatures B B to the position indicated by dotted lines C C, when the current will pass from B over wires L and N in the direction indicated by the arrows G and M, returning to K over B, through magnet D, and over wire F. Now should the polarity of K be again reversed the armatures B B will take the position now represented in the drawing.

Having thus described my invention, I claim as new and desire to secure by Letters Patent—

1. The combination, with an electric circuit that is designed to have its current flow through it in one direction at all times, of an automatic electric-current pole-changing device connected in the circuit between the dynamo-electric machine or battery and electric appliances in the circuit, substantially as set forth.

2. The combination, with an electric appliance that is designed to have its current flow through it in one direction at all times, of an automatic electric-current pole-changing device connected between the appliance and its working circuit, so that the current will flow through said pole-changer in passing to and from the appliance.

In witness whereof I hereunto subscribe my name this 27th day of May, A. D. 1889.

CYRUS A. DANALS.

Witnesses:
ALBERT L. FICKEL,
S. M. WINN.